Feb. 16, 1943.  J. F. WEIN  2,311,423
CAM FOLLOWER
Filed Nov. 26, 1941
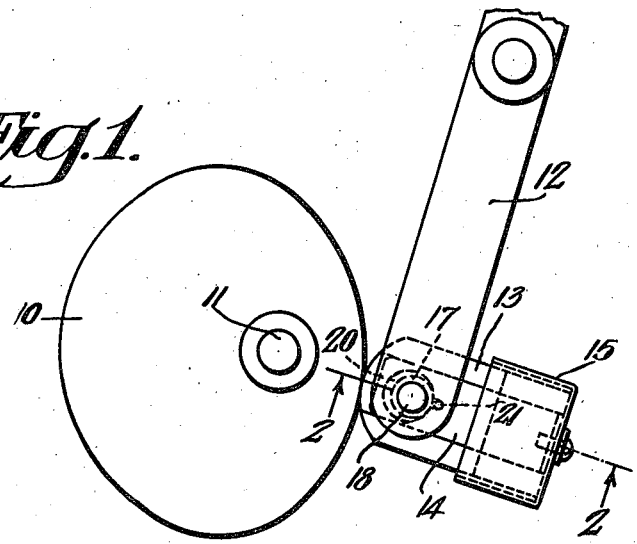
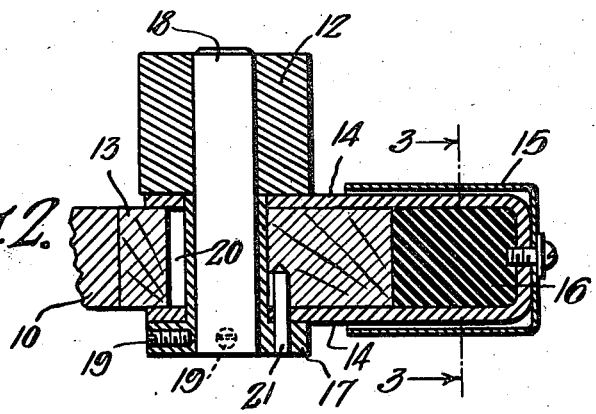
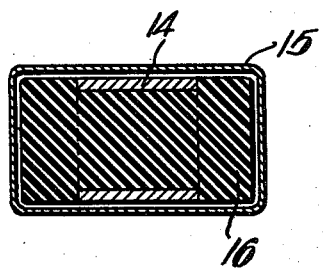
Inventor
John F. Wein
By
J. J. Huff
Attorney Patented Feb. 16, 1943

2,311,423

UNITED STATES PATENT OFFICE 2,311,423

CAM FOLLOWER

John F. Wein, Indianapolis, Ind., assignor to Radio Corporation of America, a corporation of Delaware Application November 26, 1941, Serial No. 420,502

2 Claims. (Cl. 74—569)

This invention relates to a cam follower and, more particularly, to a cam follower useful in moderately heavy machinery operating at reasonably high speeds.

In cam followers built according to the prior art, difficulties have been found in that the follower tends to bounce when it moves toward and strikes the cam and this bounce not only is noisy but tends to produce erratic operation of the mechanism actuated by the cam and, in some instances, may render the machine as a whole inoperative due to the failure of the follower to move in accordance with the contour of the cam.

In the apparatus of the present invention, a cam follower is provided which has a friction surface composed of oil-impregnated wood which tends to reduce friction and noise, and this contact member is both cushioned and damped.

One object of the invention is to provide an improved cam follower.

Another object of the invention is to provide a cam follower which will operate with a minimum of noise.

Another object of the invention is to provide a cam follower which will not bounce when it strikes the cam.

Another object of the invention is to provide a cam follower which is both cushioned and damped.

Other and incidental objects of the invention will be apparent to those skilled in the art from a reading of the following specification and an inspection of the accompanying drawing in which Figure 1 is a plan view of my improved cam follower showing its relation to its support and to a cam, Figure 2 is a vertical section taken on the line 2—2 of Figure 1, and Figure 3 is a vertical section taken on the line 3—3 of Figure 2.

Referring first to Figure 1, the cam 10 rotates on the shaft 11. For simplicity of illustration, this cam has been shown as more or less elliptical in shape but it may, of course, be of practically any shape desired or necessary. The invention is particularly useful in connection with cams which have a gradual increase in radius and then a sudden decrease in radius, considering the cam in its direction of rotation. The arm 12 is connected to the mechanism, which is to be operated by the cam and at its end carries the cam follower the contacting member of which is designated at 13. The construction of the cam follower is shown in more detail in Figures 2 and 3. The follower may be supported on an appropriate pin such as shown at 18 in Figure 2. In the present instance, this pin is shown as circular in cross-section, and is a press fit in the arm 12. On the lower end of the pin 18, a sleeve member 17 is secured against rotation by appropriate set screws 19 and the cam follower is mounted for longitudinal movement on this sleeve 17. The contacting member of the follower is the member 13 which is preferably made of oil-impregnated wood such, for example, as the type of oil-impregnated wood commercially available under the trade name "Arguto." This wooden member 13 is provided with a hole which, as indicated at 20, is appreciably larger than the outer surface of the sleeve 17. This larger dimension may be secured either by making the hole round and of greater diameter than the outer dimension of the sleeve 17, or the hole may be enlarged only longitudinally of the block 13. The member 13 is appropriately grooved in either its upper or lower surface, or both, to receive the U-shaped member 14 within which it slides, this grooving being shown in Figure 1. The member 14 is held against rotation in relation to the sleeve 17 by the pin 21 which extends through the member 14 into an appropriate slot in the member 13.

At the rear of the member 13 and engaging both that member and the inner surface of the U-shaped member 14, there is provided a block 16 of rubber or other equivalent resilient material. The particular material at present preferred for this purpose is rubber having an elasticity under compression chosen with proper regard to the average load to be impressed on the face of the member 13 and the jars to which the member 13 may be subjected. The rubber member 16 is appropriately grooved on at least one side to engage the U-shaped member 14, as shown in Figure 3, and is held in position by the member 13. It will be apparent that, when a shock is applied to the face of the member 13, it is driven backward against the member 16. This member 16 yields in response to the blow, but, at the same time, it expands against the member 14, thereby increasing the friction between the members 14 and 16 and increasing the resistance to deflection by an amount which increases both with the deflection of the member 16 and with the velocity of that deflection. This provides a resilient and gradual absorption of the shock in a very similar manner to the well known resilient shock-absorbing mechanism used in railroad car couplers.

For the sake of appearance and for the protection of the moving parts of the cam follower, and particularly to protect the rubber member 16 from oil, an appropriate cover 15 may be provided.

I claim as my invention:

1. A cam follower supported on a movable arm and including a cam contact member of oil-impregnated wood, a yoke rigidly secured to the follower arm and a shock-absorbing member consisting of a block of resilient material interposed between said contact member and said yoke and frictionally engaging said yoke for damping oscillations of said contact member.

2. A cam follower supported on a movable arm and including a cam contact member of oil-impregnated wood, a yoke rigidly secured to the follower arm and a shock-absorbing member consisting of a block of resilient material interposed between said contact member and said yoke, and both abuttingly and frictionally engaging said yoke.

JOHN F. WEIN.